United States Patent [19]
Braun

[11] Patent Number: 5,819,870
[45] Date of Patent: Oct. 13, 1998

[54] ROAD FINISHER

[75] Inventor: Arthur Braun, Deidesheim, Germany

[73] Assignee: Joseph Vogele, A.G., Mannheim, Germany

[21] Appl. No.: 649,990

[22] Filed: May 17, 1996

[30] Foreign Application Priority Data

May 19, 1995 [DE] Germany ................. 295 08 396 U

[51] Int. Cl.$^6$ ........................................ B60K 17/00
[52] U.S. Cl. ................................ 180/305; 180/197
[58] Field of Search ......................... 180/242, 243,
180/305, 306, 307, 308, 197, 233; 303/116.3,
189; 475/302, 140, 320, 321

[56] References Cited

U.S. PATENT DOCUMENTS

| | | | |
|---|---|---|---|
| 3,053,043 | 9/1962 | Knowler | 60/6 |
| 3,865,207 | 2/1975 | Schwab et al. | 180/242 X |
| 3,901,339 | 8/1975 | Williamson | 180/307 X |
| 4,140,196 | 2/1979 | Brewer . | |
| 4,183,419 | 1/1980 | Henn et al. | 180/243 |
| 4,186,816 | 2/1980 | Pfundstein | 180/243 |
| 4,213,514 | 7/1980 | Ehrlinger et al. | 180/308 |
| 4,236,595 | 12/1980 | Beck et al. | 180/243 |
| 4,401,182 | 8/1983 | Pollman | 180/242 |
| 4,528,871 | 7/1985 | Nembach | 180/243 X |
| 4,546,844 | 10/1985 | Stauffer | 180/243 |
| 4,635,743 | 1/1987 | Riehl | 180/243 |
| 4,793,434 | 12/1988 | Bachle | 180/305 X |
| 4,805,719 | 2/1989 | Kostamo | 180/307 X |
| 4,895,217 | 1/1990 | Hueckler et al. | 180/233 |
| 5,398,776 | 3/1995 | Forster | 180/308 |

FOREIGN PATENT DOCUMENTS

| | | |
|---|---|---|
| 563 515 A1 | 1/1993 | European Pat. Off. . |
| 2 548 979 A1 | 1/1985 | France . |
| 2921 698 A1 | 12/1979 | Germany . |
| 2921 756 A1 | 12/1979 | Germany . |
| 3611 268 A1 | 10/1987 | Germany . |
| 3807 899 A1 | 9/1989 | Germany . |
| 39 11229 A1 | 10/1990 | Germany . |
| 4134 840 A1 | 4/1993 | Germany . |
| 4423 867 A1 | 1/1996 | Germany . |

Primary Examiner—Robert J. Oberleitner
Assistant Examiner—Pamela J. Lipka
Attorney, Agent, or Firm—Fulwider Patton Lee & Utecht, LLP

[57] ABSTRACT

In a road finished having rear and front wheel carriage units and a hydrostatic all-wheel drive, wherein in addition to rear drivable wheels, at least two front wheels are drivable with a hydrostatic single wheel drive unit which contains a speed-variable hydraulic motor, each single wheel drive unit comprises a hydraulic speed-adjustable motor, a planetary gear set which drives the wheel in a gear reducing manner, and a unidirectional overriding clutch which is arranged between the hydraulic motor and the planetary gear set for either positively connecting the hydraulic motor automatically in the forward drive direction with the planetary gear set or for completely releasing the motor from the planetary gear set.

16 Claims, 3 Drawing Sheets

ROAD FINISHER

BACKGROUND OF THE INVENTION

This invention relates generally to heavy equipment vehicles such as road finishers used for paving road surfaces and, more particularly, to a road finisher having a main rear wheel powered drive and an auxilary front wheel drive which can be activated when needed to provide all-wheel drive without causing unnecessary braking or power loss during any operative state.

Typically, heavy equipment vehicles, such as road finishers and graders, are powered by driving the rear wheels. Some vehicles include a form of a front assisted wheel drive which can be utilized to help power the vehicle. There have been some problems associated with such heavy equipment vehicles, for example, when the front drive is connected or engaged, since the circumferential speed of the front drive wheel may be lower than the speed of the rear driven wheels during start or connection due to the particular construction of the vehicle's control system. As a result, the front drive may produce an unwanted braking action which is unsuitable during operation of the vehicle. Furthermore, undesired "dragging" of the hydraulic motors may occur during operation when the front wheel drive is not connected or if the front wheels should run faster than the hydraulic motors used to drive the wheels.

In some instances, when the front wheel drive is started and connected during the start-up phase, the drive will act as a brake, hindering performance of the vehicle. Further, should the front wheels drag the hydraulic motor when in its disconnected state, the vehicle may experience increased wear and undesired mechanical load of the hydraulic medium.

SUMMARY OF THE INVENTION

The present invention provides a novel means for improving the performance of front wheel assisted drives for heavy equipment vehicles having a main rear drive by providing a control system which allows the front wheels to be engaged and disengaged without causing unnecessary braking or power loss during connection and in the start up phase. The present invention utilizes a novel speed sensing arrangement and overriding clutches which prevent the drive unit of the front wheels from braking when the hydraulic motors which drive the front wheels of the vehicle are not at proper speed or torque, since the system will disconnect the front wheels, allowing free rotation. As soon as the hydraulic motors run at an adequate speed or torque within the working speed range of the road finisher, the overriding clutches connect the motors to the front wheels, providing additional power and traction to the vehicle.

In one embodiment of the present invention in which the heavy equipment vehicle may be a road finisher, the vehicle includes a rear and front wheel carriage unit and a hydrostatic all-wheel drive which includes a pair of rear drivable wheels and a pair of front wheels. Each of the front wheels is connected to a single wheel drive unit which includes a speed adjustable hydrostatic motor, a planetary gear set which drives the front wheel in a speed reducing ratio and a unidirectional override clutch arranged between the hydraulic motor and planetary gear set for either positively connecting the hydraulic motor in forward drive with the planetary gear set or for completely releasing the motor from the planetary gear set.

In all operative states in which the front drive is not needed, the overriding clutch prevents the hydraulic drive motor of each drivable front wheel from being "dragged," since it automatically separates the hydraulic motor from the planetary gear set and the associated wheel. Undesired braking, unnecessary power loss, heating and additional tire wear of the wheels are reduced in a constructionally simple manner. In operation (within the working speed range of the road finisher), it is only when the front wheel runs as fast as its associated hydraulic motor, which is synchronized in speed with the rear driven wheels, that the unidirectional overriding clutch establishes a positive connection between the hydraulic motor and wheel to drive the same. Hence, the road finisher has a permanent passive all-wheel drive for the working speed range only which is automatically activated in case of need, optimally adjusted to the ground and unobtrusively ensures reliable traction without much risk or side effects. The operator can concentrate on the work to be performed with the finisher within the working speed range without having to pay close attention to the control, engagement or release of the front wheel drive.

In one embodiment, the hydrostatic drive unit is space-savingly accommodated in the front wheel, which may be advantageous due to the normally limited space in this area in the road finisher and in steerability.

In another embodiment, the hydraulic motor of the front wheel runs at the correct speed to aid in traction, if required. However, the permanently passive all-wheel drive is actually only activated for cooperation in response to requirements for the working speed range, for instance between about 3.0 and 60 feet/min, whereas it would normally not be used at substantially higher transporting speeds, for instance, up to about 15 mph.

In another embodiment, the hydrostatic single-wheel drive units can be arranged on the road finisher in a space-saving manner and directly on the drivable wheels and can be relatively easily controlled. No laterally extending transmission axle structures connecting the respective wheels at both sides of the road finisher are required, which saves weight and constructional space. Differential lock functions can easily be implemented in case of need.

In another embodiment of the present invention, left and right drive units of the drivable rear wheels can be adjusted. Properly placed sensors can sense the actual speeds of the driven wheels. These are compared in a correction and control means with a selected setpoint value for the vehicle speed and corrected from case to case. When the vehicle travels on a curve, the rear driven wheels at both sides of the road finisher can be controlled at different speeds, a steering-angle sensing device converting the steering angle via the correction and control means into a corresponding speed difference of the drivable wheels. Optionally, the same can be done with the front wheel drives. Furthermore, every speed difference in a positive or negative forced slip between the front and rear wheels is sensed and evaluated, and the speeds of the front and rear wheels can be immediately corrected as needed.

In another embodiment, an electronic differential lock is effective inside a working speed range as long as the steering angle does not reach a predetermined limit value. The electronic differential lock can be automatically switched off when the predetermined steering angle is exceeded; however, it may be switched on again for a short period, for instance for 10 seconds, if there are excessive speed differences between the wheels at the two sides of the road finisher in this operative state.

Another embodiment is constructionally simple, robust and compact. Even with an overrunning wheel, the speed of the associated hydraulic motor of the front wheel drive is properly reported and adapted to the operating conditions, so that the permanent all-wheel drive can be activated in response to requirements without running with a dragged hydraulic motor in a disengaged state and without braking during connection and in the start-up phase. The unidirectional overriding clutch is characterized in that it establishes virtually no positive engagement in case of an overrunning wheel, since a slip-free positive engagement is included and effected in case of a driving hydraulic motor. To this end, automatically engaging or automatically releasing freewheeling elements or assembly may be provided within the overriding clutch, the elements being optionally biased elastically towards the engagement position.

In another embodiment, the permanently passive all-wheel drive of the road finisher is first set to the selected theoretical working speed and is then only adapted to the actual driving conditions or traction conditions which differ from the theoretical set speed and the theoretically presupposed driving and traction conditions.

In another embodiment, different speeds can be adjusted at every finisher side during cornering owing to the single-wheel drive units, which leads to optimum traction properties of the road finisher.

All in all, the present invention provides a novel road finisher with control features which effectively connects an auxilary front drive when additional traction or power is needed, without providing unwanted braking action. Other features and advantages of the present invention will become apparent from the following detailed desription when taken in conjunction with the accompanying drawings which illustrate, by way of example, the principle of the present invention.

DETAILED DESCRIPTION OF THE PREFERRED EMBODIMENT

Figure 1:
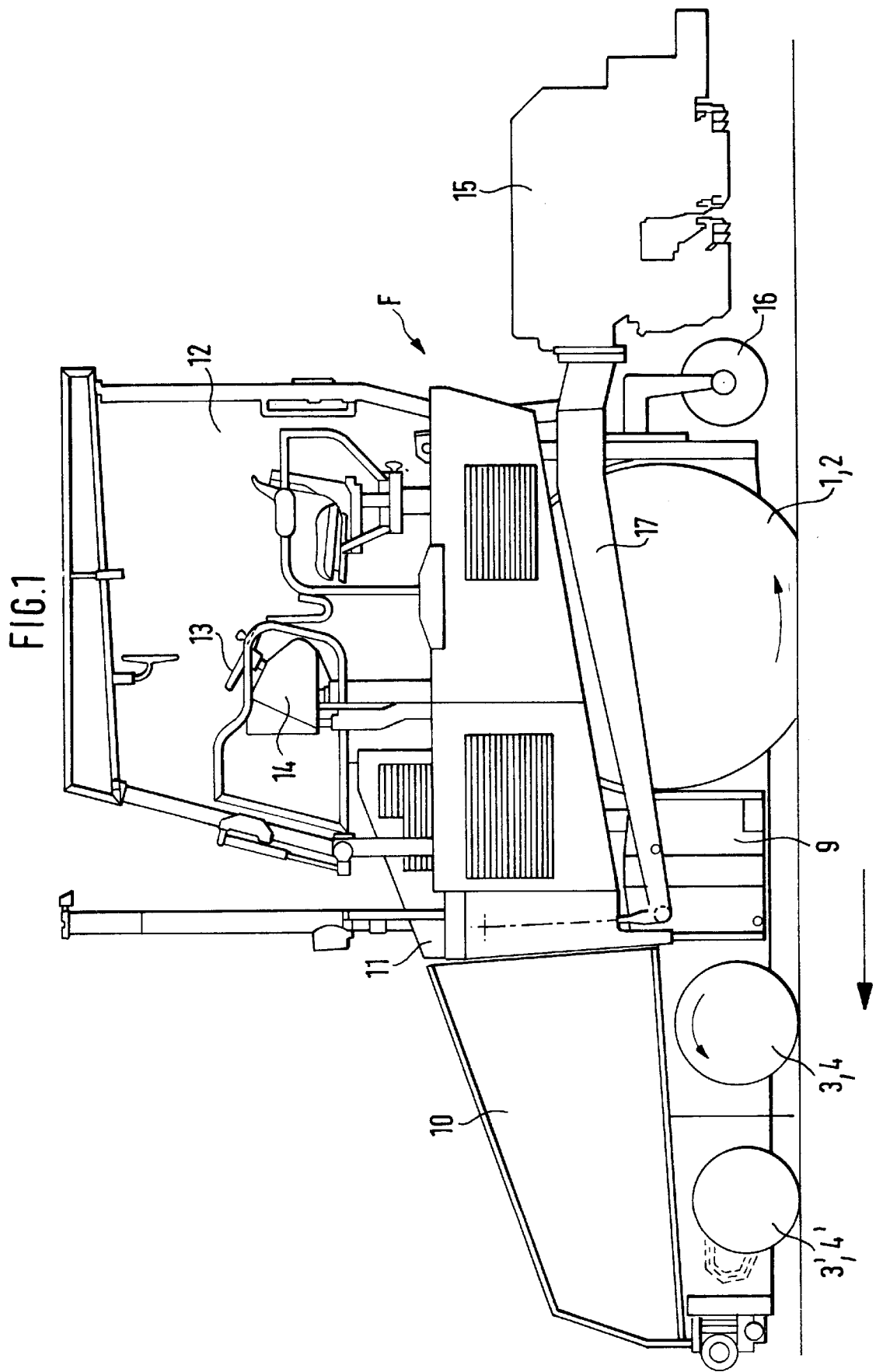
FIG. 1 is a diagrammatic lateral view of a road finisher with all-wheel drive.

A road finisher F according to FIG. 1 is equipped with rear and front wheel carriage units on a chassis 9 which carries a material hopper 10 at the front, a diesel engine 11 as the primary drive unit in the middle, and a driver's cab 12 with control elements 13 and a control panel 14 above said engine. The rear carriage unit consists, for instance, of two large wheels 1, 2. (See FIG. 2 which shows wheel 2) The front carriage unit consists, for instance, of four small wheels 3, 4; 3', 4' that are provided in tandem arrangement. (See FIG. 2 which shows wheels 4' and 4) The road finisher F is drivable in a working speed range at a small paving speed of up to about 60 feet/min in the direction of travel as deposited by the arrow and can be driven for transportation purposes at a substantially higher transporting speed range of up to about 15 mph. The road finisher is equipped with a permanently passive all-wheel drive with which, within the working speed range, the two rear wheels 1, 2 are always actively drivable, whereas the two rear tandem wheels 3, 4 of the front wheels 3, 4, 3' 4' are only drivable, if necessary.

Chassis 9 has provided thereon lateral arms 17 which have secured thereto a paving screed 15 which paves the paving material which is transported from the material hopper 10 through the chassis 9 towards the rear and distributes the material on the ground with the aid of a distribution means 16.

Figure 2:
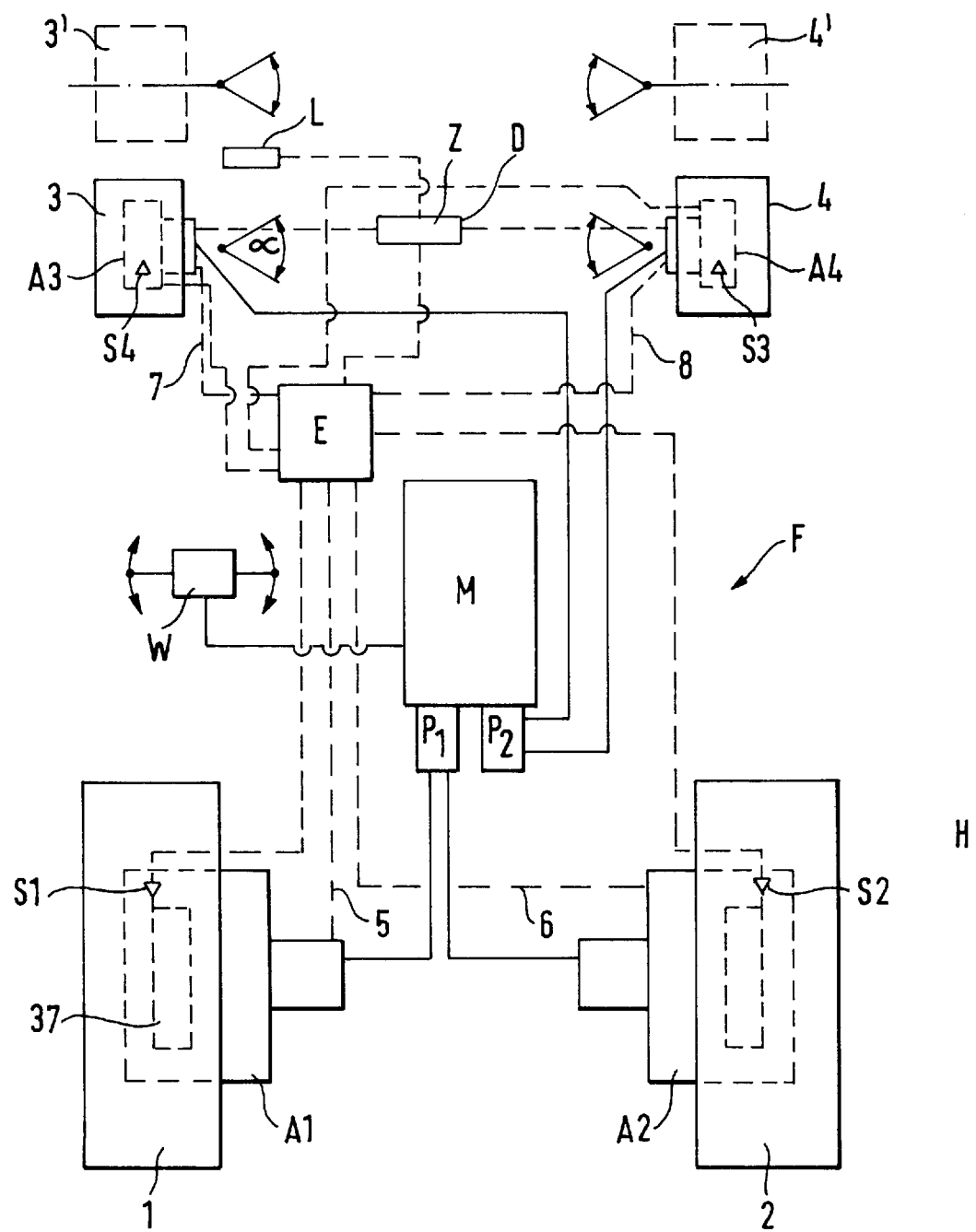
FIG. 2 is a schematic block diagram of the all-wheel drive of the road finisher shown in FIG. 1.

The block diagram in FIG. 2 shows how the individual components of the road finisher are linked.

Each rear wheel 1, 2 has arranged therein a hydrostatic single-wheel drive unit A1 and A2 (not shown in detail) which consists of a switchable planetary gear set 37, a reducing gear and a hydraulic motor. A motor M which drives hydraulic pumps P1, P2 for the individual components of the road finisher F, which are to be operated, either directly or via an interposed generator, is shown as the drive source. The hydraulic pump 21 is connected to the two individual-wheel drive units A1, A2 of the rear axle H. A speed selector device W controls motor M. The working speed (or the transporting speed) can be set as a setpoint value on the speed selection device (in the driver's cab 12 of FIG. 1). An electronic correction and control means E is connected to the speed selection device and connected via control lines 5, 6 to control devices of the hydraulic motors of drive units A1, A2 and the change speed gears 37. Sensors S1 and S2 sense the actual speeds of the rear wheels 1, 2, expediently in the gear components and are connected to the electronic correction and control means F.

Figure 3:
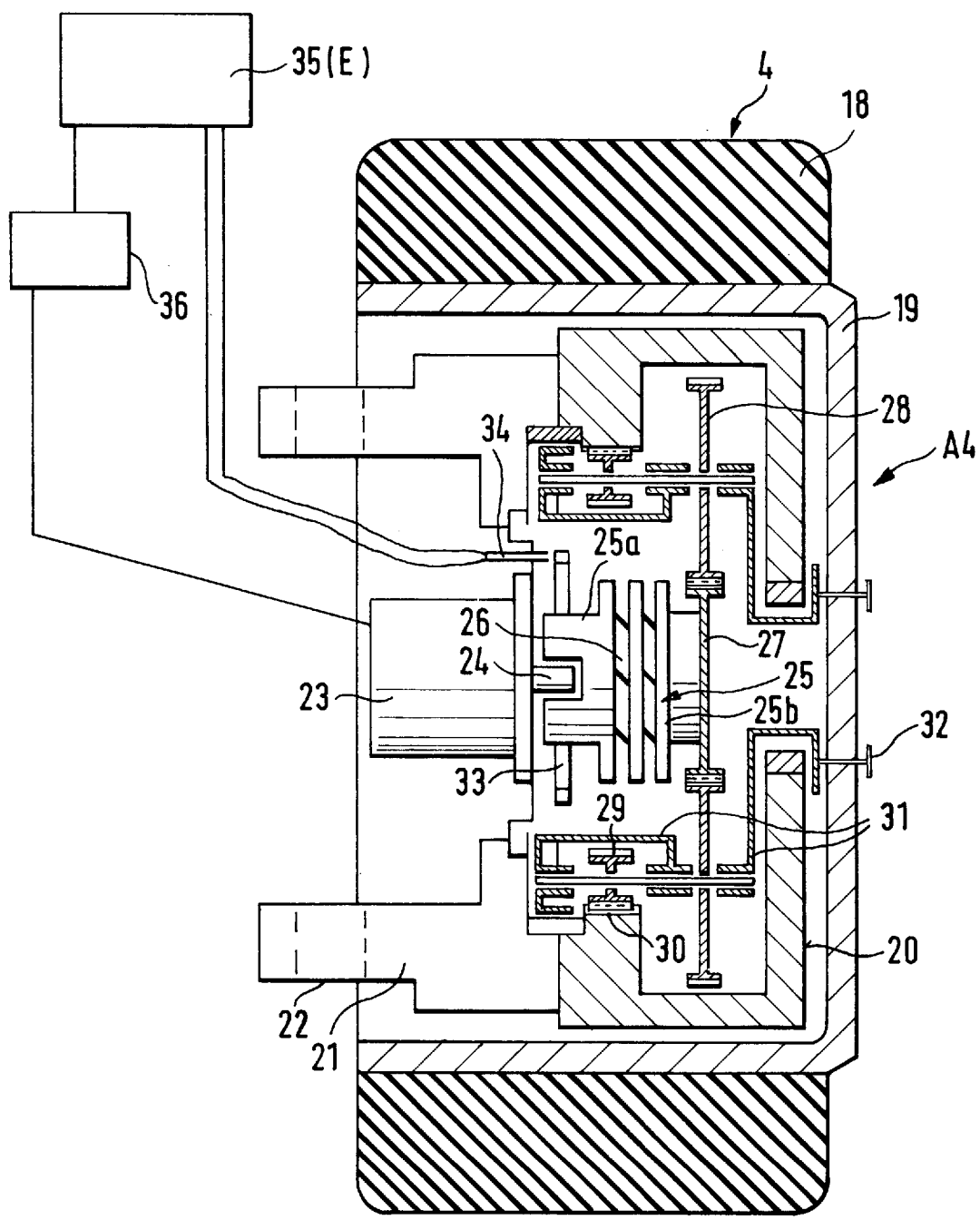
FIG. 3 is an axial section of a front wheel of the road finisher with its integrated hydrostatic single-wheel drive unit.

The second pump P2 is connected to the single-wheel drive units A3 and A4 which are installed as wheel-hub drive units in the front wheels 3, 4 and whose detailed structure can be seen in FIG. 3.

The front wheels 3, 3', 4, 4' are steerable as outlined by angle α. Sensors S3 and S4 sense the speeds of the front wheels 3, 4 and transmit them to the correction and control means E. Furthermore, sensors (not shown) may be provided for sensing the speed of the hydraulic motors of the front drive units A3 and A4 and are connected to the correction and control means E. Control means or control devices of the hydraulic motors of the drive units A3 and A4 are controlled via lines 7, 8 for correction or control of the speed of the hydraulic motors. Furthermore, there is provided a steering-angle sensing device L which may also be connected to the correction and control means E. An electronic differential lock which can be engaged and disengaged is provided between drive units A3 and A4 and is connected to the steering-angle sensing device L and contains a separate switch off device Z.

According to FIG. 3 (section of wheel 4), a tire 18 is arranged on a wheel hub 19. The wheel hub 19 is rotatably supported on a housing 20 of the drive unit A4. The housing 20 is arranged on support members 21 which in illustrated steering axles 22 are pivotable relative to the chassis of the road finisher, namely by means of a steering device (not shown). Housing 20 has mounted thereon a hydraulic motor 23 which is fed by pump P2 and has an output shaft 25 which drives either a sun gear 27 of a planetary gear set via a unidirectional overriding clutch 25 or is separated therefrom by means of the unidirectional overriding clutch 25. The unidirectional overriding clutch 25 has a first input hub 25a which is aligned relative to a second input hub 25b connected to the sun gear 27. A free-wheel assembly 26 is provided between hubs 25a and 25b and is arranged and formed such that it positively interconnects the hubs 25a and 25b as soon as the hydraulic motor 23 runs as fast as wheel 4 in the direction of travel according to FIG. 1, whereas the hubs 25a, 25b are completely separated from each other as soon as the sun gear 27 runs faster in the forward drive direction than does the hydraulic motor 23.

A test wheel 33 is mounted on the first input hub 25a and carries a circumferentially distributed transmitter (not shown) which has aligned therewith a sensor 34 which is connected to an electronic system 35 and the electronic correction or control means E of FIG. 2, respectively. The electronic system 35, in turn, is connected to a control device 36 which adjusts the speeds of the hydraulic motor 23.

The sun gear 27 drives planet gears 28 which are rotatably supported in a planet carrier 31. Planet carrier 31 is rotatably supported in housing 20. The planet gears 28 are rigidly connected to coaxial and smaller gears 29, the latter running in an inner toothing 30 of the housing 20. The planet carrier 31 is rigidly connected by member 32 to the wheel hub 19. The planetary gear set operates in a gear reducing mode, so that at a relatively high speed of the hydraulic motor and an engaged unidirectional overriding clutch 25 a relatively low speed of wheel 4 can be set.

In the working drive mode, the hydraulic pumps P1, P2 drive the hydraulic motors of all of the four drive units A1 to A4. The working speed is theoretically selected on the selection means. The actual speeds of the wheels 1 to 4 are reported to the electronic correction and control means E which controls the speeds of the hydraulic motors of the drive units A1 and A2 in the customary manner and also adjusts the speeds of the hydraulic motors of the drive units A3 and A4 to said speeds. During straight travel and without significant slip, all of the four wheels 1 to 4 take part in traction. The unidirectional overriding clutches in the drive units A3 and A4 connect the hydraulic motors to the wheels 3, 4. The road finisher moves with a permanent all-wheel drive. In case of slippage in one of the wheels, the torque of the associated hydraulic motor is reduced and the torques of the other hydraulic motors are increased.

In the start phase, the hydraulic motors of drive units A3 and A4, which are at that point slower due to the type of construction, or which operate with a smaller torque, do not brake the road finisher, since the unidirectional overriding clutches separate the hydraulic motors from the wheels 3, 4. The respective planetary gear sets in the front wheels 3, 4 are dragged by the wheel and overrun the hydraulic motor 23. As soon as the hydraulic motors run at an adequately fast pace or output an adequate torque, the unidirectional overriding clutches connect the hydraulic motors via the planetary gear sets to the wheels, so that these also provide for the necessary traction. The electronic differential lock D is interposed between wheels 3, 4.

During cornering, the steering-angle sensing device L reports the steering angle to the correction and control means E, which then provides for different speeds in accordance with the steering angle for the two rear wheels 1, 2, if necessary. If the steering angle α exceeds a predetermined value, e.g. ±10° from the normal forward direction of travel defined by a straight line, the switch-off device Z of the electronic differential lock D is activated and the electronic differential lock D is switched off. If deemed expedient, the electronic correction and control device E can supply different speeds to the two wheels 3, 4 in accordance with the steering angle α. If during cornering the speed difference between the wheels 3, 4 becomes much greater than would be in line with the steering angle, the electronic differential lock D is again engaged for a short period, e.g., for 10 sec. each time, to improve traction during cornering.

As soon as the front wheels 3, 4 run faster than their hydraulic motors, the hydraulic motors are separated from the wheels by means of the unidirectional overriding clutch, thus allowing the wheels to run freely.

During transportation, as opposed to working travel, the road finisher F may be moved at transporting speed (which is set on the selection means W; the change speed gears 37 in wheels 1, 2 are switched over), the hydraulic motors of the drive units A3, A4 run at a speed corresponding to the working speed, or they are stopped. The hydraulic motors are not dragged by wheels 3, 4 thanks to the unidirectional overriding clutches; the wheels 3, 4 overrun the hydraulic motors.

The road finisher does not necessarily need four front wheels, but it might only be equipped with only two front wheels. If, as shown, four front wheels 3, 4, 3', 4' are provided, it would also be possible to drive all of the four front wheels.

What is claimed is:

1. A road finisher having hydrostatic all-wheel drive, comprising:

a chassis having a front and rear wheel carriage unit and means for depositing paving material onto a road surface, wherein said rear wheel carriage unit includes two rear drivable wheels and said front wheel carriage unit includes at least two front wheels driven by speed-adjustable hydraulic motors, each of said front wheels being connected to a hydrostatic single wheel drive unit which includes said speed-adjustable hydraulic motor, a planetary gear set adapted to drive said wheel in a speed reducing ratio, and a unidirectional overriding clutch arranged between said speed-adjustable hydraulic motor and said planetary gear set for either automatically and positively connecting said speed-adjustable hydraulic motor in a forward drive direction with said planetary gear set strictly depending on a first speed condition with the same running speeds of the front wheels and the hydraulic motor or for completely releasing said motor from said planetary gear set automatically depending on a second speed condition with a higher speed of said front wheels than the speed of said hydraulic motor.

2. The road finisher according to claim 1, wherein each of said hydrostatic single wheel hub drive unit is installed in a wheel hub of each front wheel such that the unidirectional override clutch is arranged between an output shaft of said speed-adjustable hydraulic motor and a sun gear forming a portion of said planetary gear set.

3. The road finisher according to claim 1, wherein said hydraulic motor of said single wheel drive unit is permanently drivable at a speed which corresponds to the actual working drive speed of the road finisher within the working speed range of said road finisher.

4. The road finisher according to claim 1, wherein each of said rear drivable wheels is attached to a single wheel drive unit, each of said rear wheel single drive units and front wheel single drive units being connected to hydraulic pumps connected to a primary driving means, each rear wheel single drive units having a planetary gear set which is switchable between working travel and transporting travel.

5. The road finisher according to claim 4, further including an electronic correction and control means and speed sensors for sensing the actual speed of the front and rear wheels, said correction and control means being operatively connected to each of said front and rear single wheel drive units to correct the speed of the front and rear wheels individually in case of a forced positive or negative slippage or slip between the rear and front wheels.

6. The road finisher according to claim 5, further including an electronic differential lock connected between said front wheels which can be engaged or disengaged when the steering angle of said front wheel exceeds a predetermined value from a direction of travel defined by a straight line.

7. The road finisher according to claim 6, wherein said electronic differential lock includes an automatic switch off device and said finisher further includes a steering angle sensing device connected to said correction and control means for transmitting a switch off signal to said switch off device as soon as the steering angle of said front wheels reaches the predetermined value.

8. The road finisher according to claim 7, wherein said differential lock is switchable between an on and off position via said automatic switch off and is connectable to a time switching means for a predetermined period of time in response to a correction signal generated by said correction and control means which represents a predetermined speed differential between the front two wheels.

9. The road finisher according to claim 1, wherein each of said front single wheel drive units includes a unidirectional overriding clutch having a first input hub which is rigidly connected to said output shaft of said speed-adjustable hydraulic motor and a second input hub rigidly connected to a sun gear forming part of said planetary gear set, and further including a test wheel with a circumferentially distributed transmitter connected to said first input hub and a sensor aligned relative to said transmitter and connected via an electronic circuit to a correction and control means for setting the speed of said hydraulic motor.

10. The road finisher according to claim 9, wherein said electronic correcting and control means is connected to a speed selection device for selecting the desired speed of said road finisher.

11. The road finisher according to claim 6, wherein said correcting and controlling means and said steering-angle sensing device produce an adjusting signal for adjusting the speed of each of said hydraulic motors which drives each of said rear and front wheels.

12. The road finisher according to claim 1, further including an electronic correction and control means and speed sensors for sensing the actual speed of the front and rear wheels, said correction and control means being operatively connected to each of said front and rear single wheel drive units to correct the speed of the front and rear wheels individually in case of a forced positive or negative slippage between the rear and front wheels.

13. The road finisher according to claim 1, further including an electronic differential lock connected between said front wheels which can be engaged or designed when the steering angle of said front wheel exceeds a predetermined value from a direction of travel defined by a straight line.

14. The road finisher according to claim 13, wherein said electronic differential lock includes an automatic switch off device and said finisher further includes a steering angle sensing device connected to said correction and control means for transmitting a switch off signal to said switch off device as soon as the steering angle of said front wheels reaches the predetermined value.

15. The road finisher according to claim 14, wherein said differential lock which is switchable between an on and off position via said automatic switch off device is connectable to a time switching means for a predetermined period of time in response to a correction signal generated by said correction and control means which represents a predetermined speed differential between the front two wheels.

16. The road finisher according to claim 13, wherein said correction and control means and said steering-angle sensing device produce an adjusting signal for adjusting the speed of each of said hydraulic motors which drives each of said rear and front wheels.

* * * * *